United States Patent [19]

Selvidge et al.

[11] 4,351,300
[45] Sep. 28, 1982

[54] LP GAS CARBURETOR

[76] Inventors: Richard H. Selvidge, Box 299 Rte. 9, Poplar Bluff, Mo. 63901; Dewey Clark, Box 65A Rte. 2, Broseley, Mo. 63932

[21] Appl. No.: 119,143

[22] Filed: Feb. 6, 1980

[51] Int. Cl.³ .......................................... F02M 21/02
[52] U.S. Cl. .................... 123/527; 48/180 C; 261/23 A
[58] Field of Search ............... 123/525, 527, 59 PC, 123/586; 261/DIG. 78, 23 A; 48/180 C

[56] References Cited

U.S. PATENT DOCUMENTS

| | | | |
|---|---|---|---|
| 2,155,763 | 4/1939 | Laub | 123/525 |
| 2,319,971 | 5/1943 | Bodine | 48/180 C |
| 2,340,954 | 2/1944 | Garretson | 48/180 C |
| 2,606,108 | 8/1952 | Ensign | 123/527 |
| 3,494,341 | 2/1970 | Serruys | 123/586 |
| 3,843,338 | 10/1974 | Zonker | 123/527 |
| 3,977,374 | 8/1976 | August | 261/DIG. 78 |
| 4,264,535 | 4/1981 | Kikura | 261/23 A |

FOREIGN PATENT DOCUMENTS 993291  7/1976  Canada ............................ 48/180 C

*Primary Examiner*—Ronald H. Lazarus
*Attorney, Agent, or Firm*—Senniger, Powers, Leavitt and Roedel

[57] ABSTRACT

An LP gas carburetor adapted for use as the only carburetor for an engine or, alternatively, for use in conjunction with an existing gasoline carburetor (in particular, a two barrel carburetor) on an engine, the LP gas carburetor comprising a body adapted to be mounted on the engine, the body having two main passages and one auxiliary passage extending therethrough for the flow of an air-fuel mixture through the LP gas carburetor, a main inlet port in communication with the main passages for the flow of LP gas to the main passages, and an auxiliary inlet port in communication with the auxiliary passage for the flow of LP gas to the auxiliary passage. A main valve is provided for controlling the flow of LP gas from a source thereof through the main inlet port to the main passages, and an auxiliary valve is provided for controlling the flow of LP gas from the source through the auxiliary inlet port to the auxiliary passage for the idling of the engine. An LP gas carburetor adapted for use as the only carburetor for an engine or in conjunction with an existing single-barrel gasoline carburetor, and an LP gas carburetor adapted for use as the only carburetor for an engine or in conjunction with an existing four-barrel gasoline carburetor are also disclosed.

20 Claims, 10 Drawing Figures

LP GAS CARBURETOR

BACKGROUND OF THE INVENTION

This invention relates to a carburetor, and more particularly to an LP gas carburetor.

The invention involves an improvement upon the LP gas carburetor of the type such as shown, for example, in U.S. Pat. No. 2,155,763 for use in conjunction with a gasoline carburetor on an engine, the LP gas carburetor comprising a body having a passage extending therethrough for the flow of an air-LP gas mixture to the engine and an inlet port in communication with the passage for the flow of LP gas to the passage. The LP gas carburetor enables the engine to be run on LP gas when available, LP gas being more economical and pollution-free than gasoline. The engine may, nonetheless, be run on gasoline when LP gas is unavailable. A problem with the prior LP gas carburetor is its inability to produce air-LP gas mixtures for smooth, efficient operation of the engine throughout the operating range of the engine, in particular during the idling and the acceleration of the engine. Another problem with the prior LP gas carburetor is that it may be used only in combination with gasoline carburetors configured to have a tubular member extending within the passage in the LP gas carburetor, thereby defining an orifice for the flow of LP gas.

This invention also involves an improvement over the prior art LP gas carburetor of the type adapted to be used as the only carburetor for an engine comprising a body adapted to be mounted between a housing having an air throttle valve and the intake manifold of an engine, the body having a passage extending therethrough receiving air from the housing. The prior LP gas carburetor of this type, like the LP gas carburetor described above, is unable to develop air-LP gas mixtures for smooth and efficient operation of the engine throughout the operating range of the engine.

SUMMARY OF THE INVENTION

Among the several objects of this invention may be noted the provision of an LP gas carburetor which is adapted to be used as the only carburetor for an engine or with an existing gasoline carburetor for an engine; the provision of such an LP gas carburetor which supplies air-LP gas mixtures to the engine for smooth and efficient operation of the engine throughout its operating range; the provision of such an LP gas carburetor which has two separate and distinct means for supplying mixtures of air and LP gas to the engine, the first supplying an air-LP gas mixture for the idling of the engine and the second supplying air-LP mixtures for higher speed running of the engine; the provision of such an LP gas carburetor which is adapted for use with gasoline carburetors of a wide range of sizes and configurations; the provision of such an LP gas carburetor which improves the mixing of air and gasoline in the air-gasoline mixture from the gasoline carburetor; the provision of such an LP gas carburetor which is of relatively simple and economical construction; and the provision of such an LP gas carburetor which is relatively compact and thus usable in those applications in which the space available for the carburetor is limited.

Briefly, a carburetor of this invention comprises a body adapted to be mounted on an engine, the body having two main passages and one auxiliary passage extending therethrough for the flow of an air-fuel mixture through the carburetor, a main inlet port in communication with the main passages for the flow of LP gas to the main passages, and an auxiliary inlet port in communication with the auxiliary passage for the flow of LP gas to the auxiliary passage. A main valve is provided for controlling the flow of LP gas from a source through the main inlet port to the main passages, and an auxiliary valve is provided for controlling the flow of LP gas from the source through the auxiliary inlet port to the auxiliary passage for idling of the engine.

An alternative embodiment of the carburetor of this invention adapted for use as the only carburetor for an engine or in conjunction with an existing singlebarrel carburetor for an engine comprises a body adapted to be mounted on the engine, the body having a passage therethrough for flow of an air-fuel mixture through the carburetor, a main and an auxiliary inlet port in communication with the passage for the flow of LP gas to the passage, and a tube extending into the passage, the axial passage in the tube being in communication with the auxiliary inlet port. A main valve is provided for controlling the flow of LP gas from a source through the main inlet port to the passage, and an auxiliary valve is provided for controlling the flow of LP gas from the source through the auxiliary inlet port to the passage for idling of the engine.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
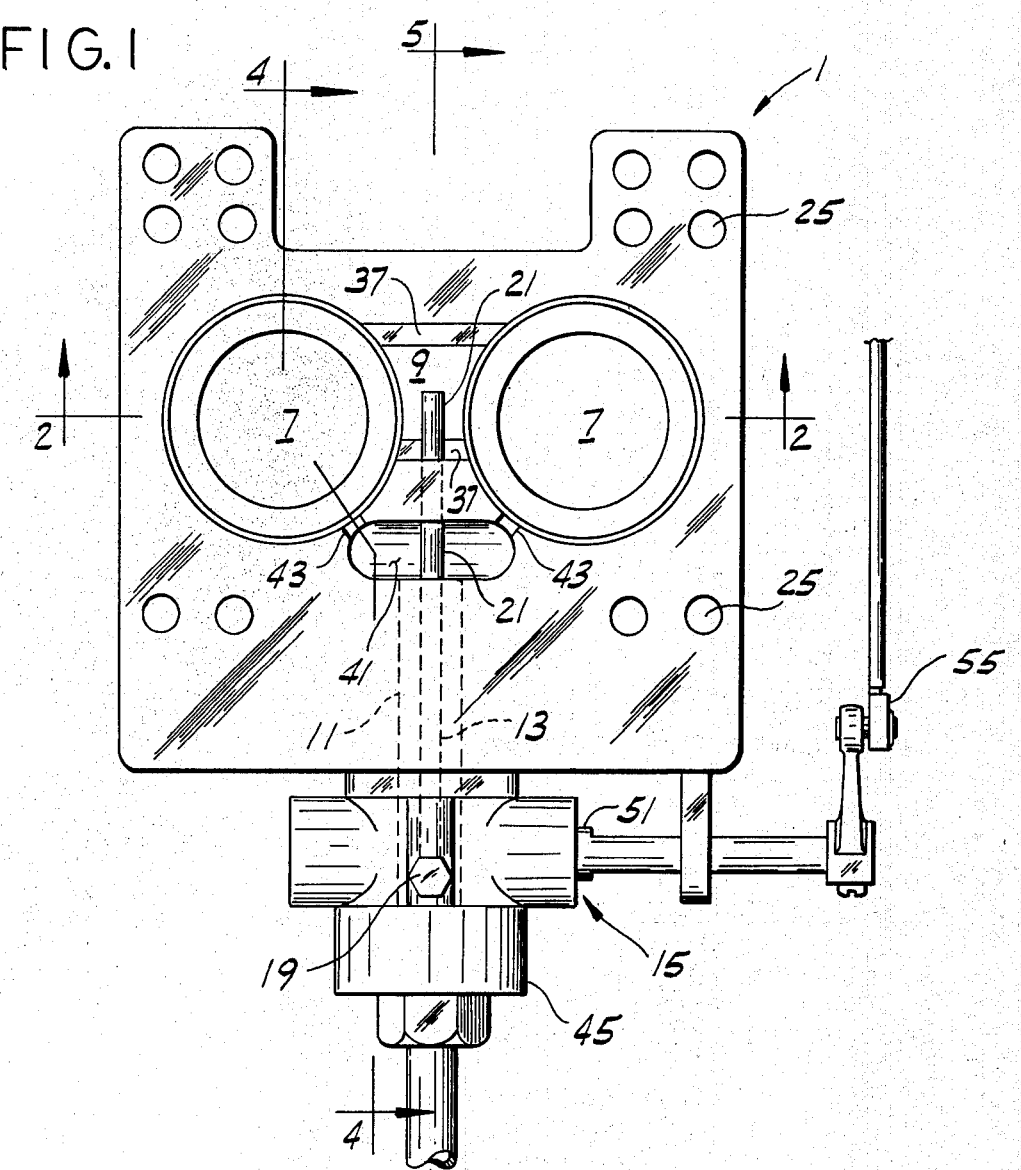
FIG. 1 is a top plan of an LP gas carburetor of this invention.

Referring to FIGS. 1-6, there is generally indicated at 1 an LP gas carburetor of this invention comprising a body 3 adapted to be mounted on an engine 5, the body having two main passages 7 and an auxiliary passage 9 extending therethrough for the flow of an air-fuel mixture through the carburetor, a main inlet port 11 in communication with the main passages for the flow of LP gas to the main passages, and an auxiliary inlet port 13 in communication with the auxiliary passage for the flow of LP gas to the auxiliary passage. A main valve 15 is provided (see FIG. 6) for controlling the flow of LP gas from a source 17 of LP gas through the main inlet port to the main passages, and an auxiliary valve 19 is provided for controlling the flow of LP gas from the source through the auxiliary port to the auxiliary passage for idling of the engine 5. The LP gas carburetor further comprises a tube 21 extending into the auxiliary passage 9, the axial passage in the tube being in communication with the auxiliary inlet port 13 for the flow of LP gas to the auxiliary passage.

Figure 2:
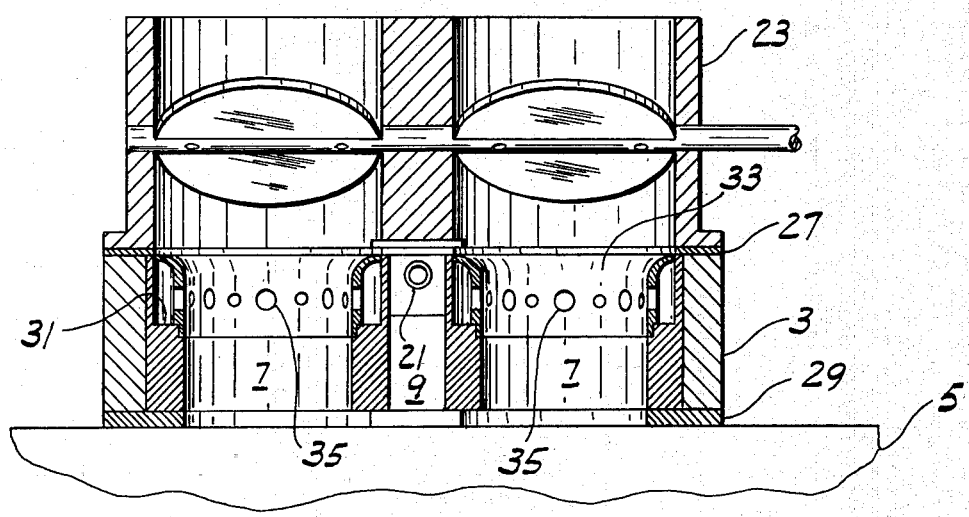
FIG. 2 is a transverse section of the FIG. 1 carburetor on line 2—2 of FIG. 1.
Figure 3:
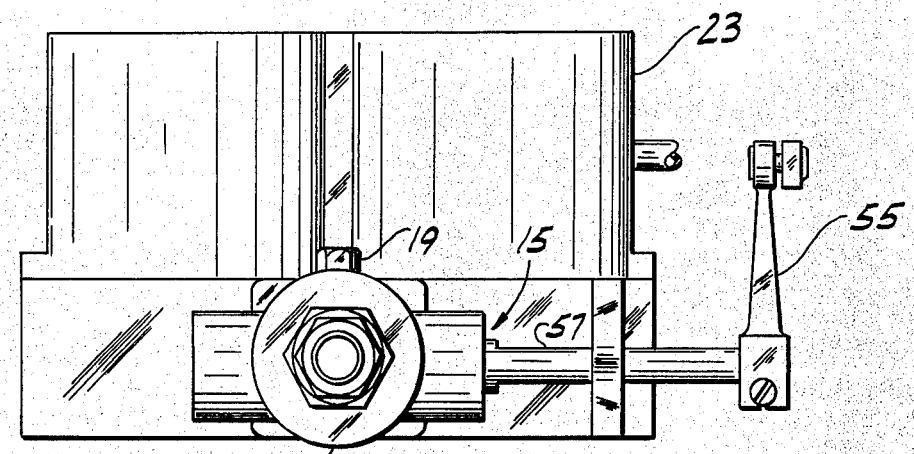
FIG. 3 is a front elevation of the FIG. 1 LP gas carburetor.
Figure 4:
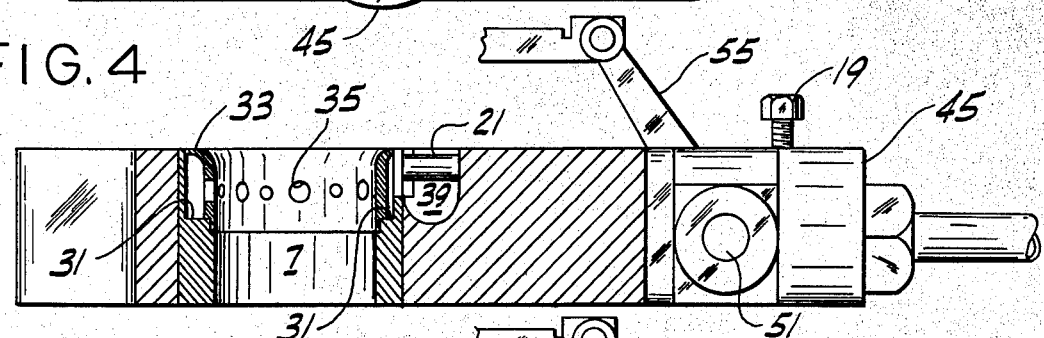
FIG. 4 is a section on line 4—4 of FIG. 1.
Figure 5:
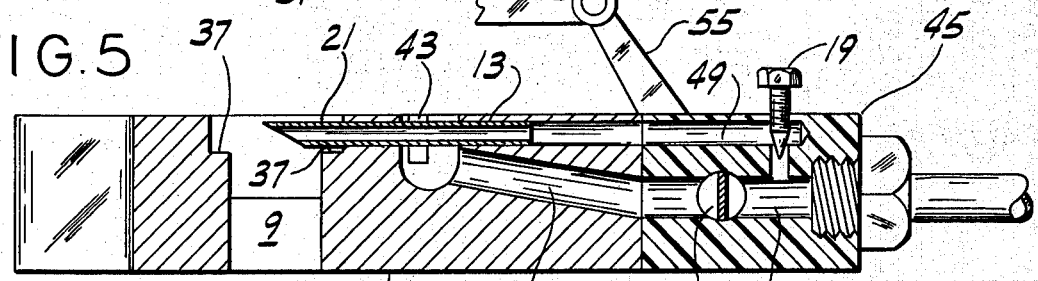
FIG. 5 is a section on line 5—5 of FIG. 1.
Figure 6:
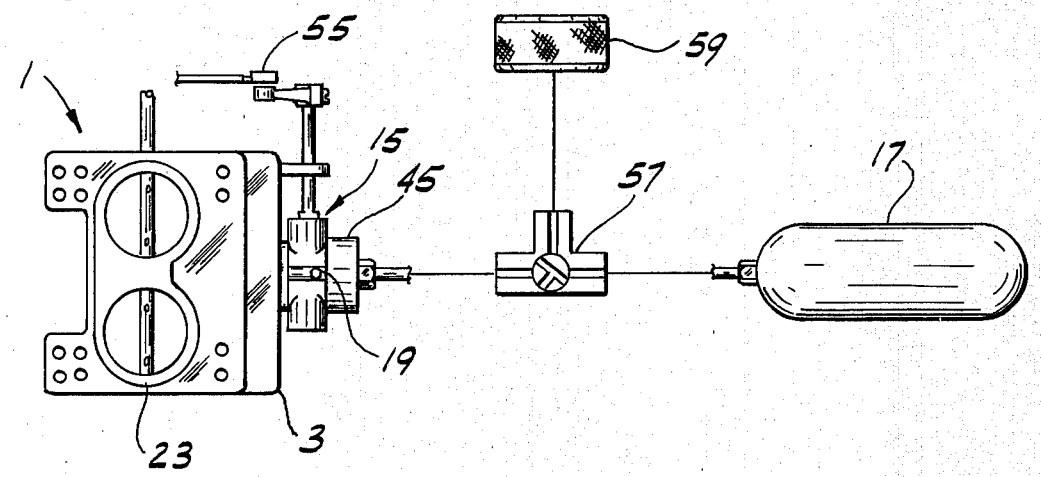
FIG. 6 is a schemtic viewing showing a mechanical linkage and sources of air and LP gas connected to the carburetor.

In particular, the body 3 comprises a relatively flat plate of metal, preferably, one to one and one-half inches thick, adapted to be mounted between the inlet manifold of the engine 5 and an existing gasoline carburetor, such as a two-barrel carburetor, for the engine or, alternatively, between the manifold and a housing having air throttle valves for controlling the flow of air to the LP gas carburetor, either the gasoline carburetor and housing being generally indicated at 23 in FIGS. 2 and 3. The carburetor body 3 has a plurality of holes 25 adjacent each of its corners, the holes being so located as to receive carburetor mounting bolts for engines having different bolt patterns. An upper gasket 27 is provided between the body and the carburetor or housing 23 and a lower gasket 29 is provided between the body 3 and the intake manifold of the engine 5. The upper and lower gaskets are so configured as to effect a seal at the upper and lower peripheral edge margins of the carburetor body 3 but to allow the flow of an air-LP gas mixture through the auxiliary passage 9.

Each main passage 7 is of generally circular section, the interior wall of the body defining the main passage having a shoulder 31 for supporting LP gas metering means such as a metering ring 33 having a plurality of holes 35 for distributing LP gas into the air flowing through the main passage 7. The auxiliary passage 9 is between and generally parallel to the main passages 7, the auxiliary passage being defined by two opposing curved walls and two opposing side walls relieved to form opposed shoulders 37. The shoulders 37 create turbulence for improved mixing of the air and LP gas flowing through the auxiliary passage. The tube 21 terminates in the space between the shouldered portions 37. The air-LP gas mixture for idling of the engine is supplied from the auxiliary passage 9; the air-LP gas mixtures for higher speed running of the engine are supplied from the main passages 7. This arrangement of passages has been found to yield improved engine performance (i.e., smoother, more efficient operation) throughout the operating range of the engine, in particular during idling and acceleration.

The carburetor body further has a recess 39 in the upper surface thereof, the recess comprising a relatively large central portion 41 receiving LP gas from the inlet port 11, and smaller end portions 43 extending to the main passages 7. With the carburetor body mounted between the intake manifold of an engine and the housing or the gasoline carburetor 23, the upper gasket 27 covers the end portions 43 but leaves uncovered the central portion 41. When the LP gas carburetor is used in conjunction with an existing gasoline carburetor for an engine, liquid gasoline undesirably dispensed from the gasoline carburetor during periods of acceleration is received in the central portion of the recess 39 and is dispensed into the air-gasoline mixture by the LP gas carburetor, as more fully discribed hereinafter.

A valve member 45 extends from an edge of the carburetor body 3, the valve member having a relatively larger lower bore 47 in communication with the main inlet port 11, and a smaller upper bore 49 in communication with the auxiliary inlet port 13. The outer end of the bore 47 is internally threaded for receiving a threaded connection to the source of the LP gas 17. The main valve 15 comprises a movable valve member such as spool 51 rotatably mounted in the valve member 45, the spool having a central recessed portion 53. The spool is rotated by engine speed control means such as linkage 55 between a closed position blocking the flow of LP gas to the main inlet port 11 and an open position unblocking flow of LP gas, the volume of LP gas flowing past the recessed portion 53 of the spool being increased as the spool 51 is rotated away from its closed position. A shown in FIG. 5, the upper bore 49 is in communication with the lower bore 47 upstream of the spool 151, so that LP gas is received in the bore 47 regardless of the position of the spool. The auxiliary valve 19 comprises a needle valve threaded in a hole in the valve member 45, the needle valve extending into the bore 49 and being adjustable for allowing the flow of sufficient LP gas to the auxiliary passage 9 for idling of the engine.

When the LP gas carburetor 1 of this invention is used as the only carburetor for an engine 5, the carburetor body is mounted between the housing 23 and the intake manifold of the engine 5. The needle valve is adjusted by rotating it until the desired engine idling speed is achieved. For higher engine speeds the linkage 55 is used to rotate the spool 5 away from its closed position.

When the LP gas carburetor is mounted on the engine 5 in combination with an existing gasoline carburetor 23 for the engine, valve means 57 (see FIG. 6) is provided enabling alternative but not simultaneous operation of the carburetors. Preferably, the valve means 57 comprises a three-way valve in combination with the source of LP gas 17, a source of air 59 such as the housing of a carburetor air cleaner, and the valve member 45 on the carburetor body. In the first of three positions of the valve means 57, the flow of air and LP gas from the sources 59 and 17 to the LP gas carburetor is blocked. In the second position, the flow of LP gas is blocked but the flow of air is unblocked, and in the third position the flow of air is blocked but the flow of LP gas is unblocked. When the gasoline carburetor is in use, the valve means is moved by means (not shown) to either its first or second position to deactuate the LP gas carburetor. The deactuated LP gas carburetor, however, has been found to improve the performance of the gasoline carburetor by causing turbulence in the air-gasoline mixture flowing to the engine, and, as described above, by receiving liquid gasoline unintentionally dispensed by the gasoline carburetor during acceleration of the engine in the recess 39 and metering the liquid gasoline through the metering rings 33 into the air-gasoline mixture flowing through the main passages 7. In addition, the air supplied to the LP gas carburetor from the source 59 when the valve means 57 in its second position has been found to improve the carburetion in certain types of gasoline carburetors. When the gasoline carburetor is not in use, the valve means 57 may be moved to its third position for unblocking flow of LP gas to the LP gas carburetor. The operation of the LP gas carburetor here is the same as that described above when the LP gas carburetor is the only carburetor for the engine.

Figure 7:
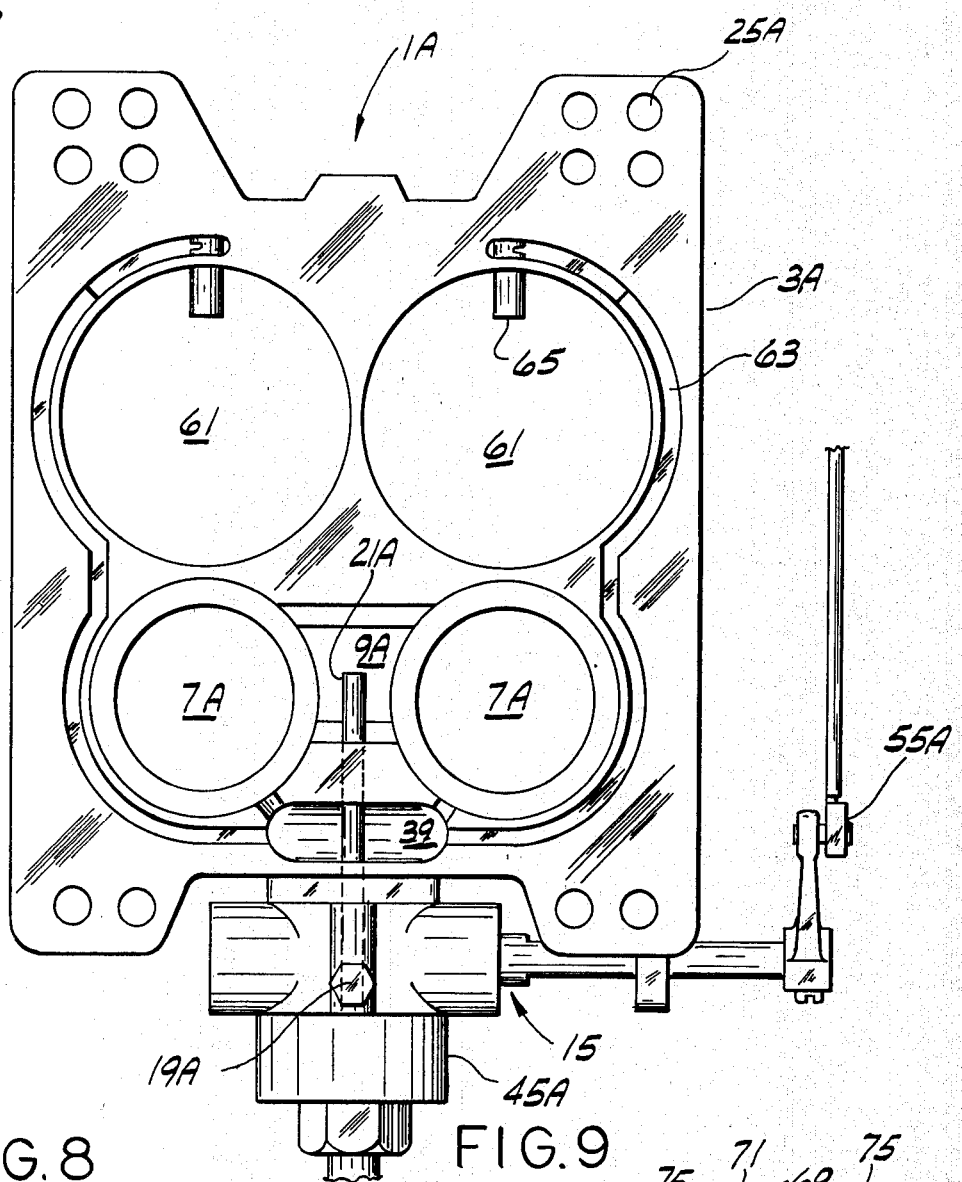
FIG. 7 is a top plan view of an alternative embodiment of the LP gas carburetor.

An alternative embodiment 1A of the carburetor of this invention is shown in FIG. 7. It is similar to the carburetor 1 shown in FIGS. 1-5 except that the carburetor body 3A has two secondary passages 61, two enlongate recesses 63, and two tubes 65 extending into the secondary passages, the elongate recesses 63 being in communication with the recess 39A and with the tubes 65 for enabling flow of LP gas to the secondary passages 61. This embodiment of the carburetor is particularly adapted for use with a four-barrel gasoline carburetor or housing (not shown) having two secondary barrels which open for the flow of additional air during acceleration of the engine, the additional air flowing through the secondary passages 61. Normally these two secondary barrels are closed and LP gas does not flow through the tubes 65 into the secondary passages 61. When the two secondary barrels open, however, a vacuum draws LP gas into the secondary passages 61 through the tubes 65. It is contemplated that in lieu of tubes 65, recess (not shown) may be provided in the lower surface of the carburetor body 3A, the recesses extending between the main passages 7A and the secondary passages 61 in the carburetor body and enabling flow of air-LP gas mixtures from the main passages to the secondary passages when the secondary barrels open and a vacuum is created in the secondary passages.

In the use of the LP gas carburetor 1A in conjunction with an existing gasoline carburetor on an engine, the LP gas carburetor is connected to valve means, such as the three-way valve means 57, connected to sources of LP gas and air, such as the sources 17 and 59. The operation of the carburetor 1A here is similar to the above-described operation of the carburetor 1 except that an air-LP gas mixture flows through the secondary passages 61 when the two secondary barrels of the fourbarrel gasoline carburetor open for flow of additional air. The operation of the carburetor 1A when used as the only carburetor for an engine is similar to the above-described operation of the carburetor 1.

Figure 8:
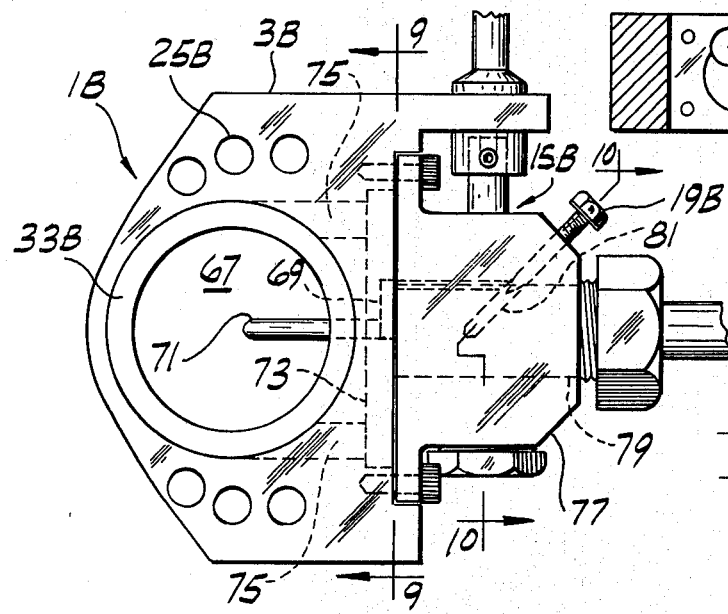
FIG. 8 is a top plan view of a further alternative embodiment of the LP gas carburetor.
Figure 9:
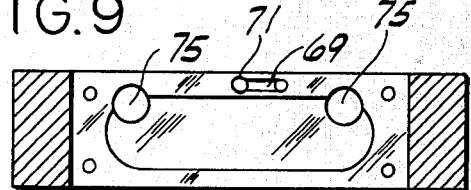
FIG. 9 is a section on line 9—9 of FIG. 8.
Figure 10:
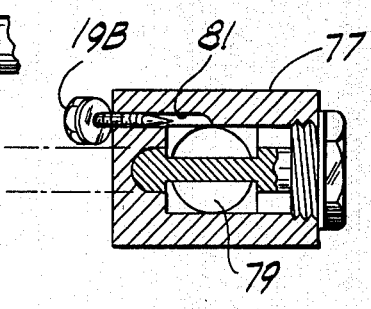
FIG. 10 is a section on line 10—10 of FIG. 9.

A further alternative embodiment 1B of the carburetor of this invention adapted for use in conjunction with an existing single barrel gasoline carburetor for an engine is shown in FIGS. 8-10. It is generally similar to the carburetor 1 shown in FIGS. 1-5 except that the carburetor body 3B has only a single passage 67 and the auxiliary inlet port 69 is in communication with the passage 67 through a tube 71. The tube 71 terminates at or near the center of the passage 67 where the greatest vacuum is developed in the carburetor during the operation of the engine, the vacuum drawing sufficient LP gas through the auxiliary inlet port 69 and tube 71 for smooth, efficient idling of the engine. The carburetor 1B further comprises a main inlet port 73 having two branches 75 extending to a metering ring 33B in the passage 67. A valve member 77 is provided on the side of the body 3B having a relatively large upper bore 79 in communication with the main inlet port, and a smaller bore 81 in communication with the auxiliary inlet port 69.

In the use of the carburetor 1B of this invention with an existing gasoline carburetor on an engine, the carburetor is connected to valve means, such as the three-way valve means 57, connected to sources of LP gas and air, such as the sources 17 and 59. The operation of the carburetor 1B as the only carburetor for an engine or in conjunction with an existing gasoline carburetor is similar to the above-described operation of the carburetor 1.

While the carburetor of this invention is shown and described as being used with LP (liquefied petroleum) gas, it is contemplated that the carburetor could be used with other gaseous fuels such as for example LN (liquefied natural) gas.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An LP gas carburetor comprising:
    a body adapted to be mounted on an engine, the body having a passage therethrough for flow of an air-fuel mixture through the carburetor, and a main and an auxiliary inlet port in communication with the passage for the flow of LP gas to the passage;
    a tube projecting into and terminating within the passage, the axial passage in the tube being in communication with the auxiliary inlet port;
    a main valve for controlling the flow of LP gas from a source thereof through the main inlet port to the passage; and
    an auxiliary valve for controlling the flow of LP gas from the source through the auxiliary inlet port to the passage for the idling of the engine.

2. An LP gas carburetor as set forth in claim 1 wherein the tube terminates generally centrally with respect to the passage in the body.

3. An LP gas carburetor as set forth in claim 1 further comprising metering means in the passage in the body for metering and distributing LP gas from the main inlet port to the air flowing through said passage.

4. An LP gas carburetor as set forth in claim 1 wherein the carburetor is adapted to be mounted between an existing carburetor for the engine and the engine, and wherein the LP gas carburetor further comprises valve means in communication with the main and auxiliary valves and with a source of LP gas, the valve means unblocking flow of LP gas to the LP carburetor when the LP gas carburetor is in use and blocking flow of LP gas thereto when the gasoline carburetor is in use.

5. An LP gas carburetor as set forth in claim 4 wherein the valve means is in communication with a source of air, the valve means unblocking air flow to the LP gas carburetor when the gasoline carburetor is in use and blocking air flow thereto when the LP gas carburetor is in use.

6. An LP gas carburetor comprising:
    a body adapted to be mounted on an engine, the body having two main passages and an auxiliary passage extending therethrough for the flow of an air-fuel mixture through the carburetor, a main inlet port in communication with the main passages for the flow of LP gas to the main passages, and an auxiliary inlet port in communication with the auxiliary passage for the flow of LP gas to the auxiliary passage;
    a main valve for controlling the flow of LP gas from a source thereof through the main inlet port to the main passages;
    an auxiliary valve for controlling the flow of LP gas from the source through the auxiliary inlet port to the auxiliary passage for the idling of the engine; and
    a tube projecting into and terminating within the auxiliary passage, the axial passage of the tube being in communication with the auxiliary inlet port.

7. An LP gas carburetor as set forth in claim 1 wherein the auxiliary passage is between the two main passages.

8. An LP gas carburetor as set forth in claim 7 wherein the auxiliary passage is defined by two opposed side walls relieved to form opposed shoulders, the shoulders creating turbulence for improved mixing of the air and LP gas flowing through the auxiliary passage.

9. An LP gas carburetor as set forth in claim 8 wherein the said tube extends within the auxiliary passage at a level above the shoulders and terminates in an end between the shoulders.

10. An LP gas carburetor as set forth in claim 8 wherein the cross-sectional area of the main passages is greater than that of the auxiliary passage.

11. An LP carburetor as set forth in claim 1 having a recess in communication with both the main passages and the main inlet port.

12. An LP gas carburetor as set forth in claim 1 further comprising metering means in the main passages for metering and distributing LP gas from the main inlet port to air flowing through the main passages.

13. An LP gas carburetor as set forth in claim 1 further comprising a valve member secured to the body having a main bore and an auxiliary bore, the main valve comprising a movable valve member for blocking and unblocking flow of LP gas through the main bore and the auxiliary valve comprising a needle valve for controlling flow of LP gas through the auxiliary bore.

14. An LP gas carburetor as set forth in claim 1 wherein the body further has two secondary passages extending therethrough spaced from the main passages, the main inlet port being in communication with the secondary passages for the flow of LP gas thereto.

15. An LP gas carburetor as set forth in claim 10 further comprising two tubes each extending into one of the secondary passages, the axial passage of each tube being in communication with the main inlet port.

16. An LP gas carburetor as set forth in claim 1 further comprising a housing secured to the body at the side thereof away from the engine for controlling the flow of air through the main passages, and wherein the body has a plurality of holes adapted to receive bolts for mounting the carburetor on the engine, the holes being so located as to receive bolts for engines having different bolt patterns.

17. An LP gas carburetor as set forth in claim 1 wherein the carburetor is adapted to be mounted between an existing gasoline carburetor for an engine and the engine, and wherein the body has a plurality of holes adapted to receive bolts for mounting the body between the engine and the existing gasoline carburetor, the holes being so located as to receive bolts for engines having different bolt patterns.

18. An LP gas carburetor as set forth in claim 1 wherein the carburetor is adapted to be mounted between an existing gasoline carburetor for the engine and the engine, and wherein the LP gas carburetor further comprises valve means in communication with the main and auxiliary valves and with a source of LP gas, the valve means unblocking flow of LP gas to the LP carburetor when the LP gas carburetor is in use and blocking flow of LP gas thereto when the gasoline carburetor is in use.

19. An LP gas carburetor as set forth in claim 18 wherein the valve means is also in communication with a source of air, the valve means unblocking air flow to the LP gas carburetor when the gasoline carburetor is in use and blocking air flow thereto when the LP gas carburetor is in use.

20. An LP gas carburetor as set forth in claim 18 wherein said body has a recess in communication with both main passages and the main inlet port, the recess being adapted to receive gasoline from the gasoline carburetor when the gasoline carburetor is in use.

* * * * *